(12) United States Patent
Rodgers

(10) Patent No.: US 11,580,081 B1
(45) Date of Patent: Feb. 14, 2023

(54) SYSTEM AND METHOD FOR LARGE SCALE ANOMALY DETECTION

(71) Applicant: UIPCO, LLC, San Antonio, TX (US)

(72) Inventor: Fredrick William Rodgers, Northlake, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 176 days.

(21) Appl. No.: 17/083,438

(22) Filed: Oct. 29, 2020

Related U.S. Application Data

(60) Provisional application No. 62/929,132, filed on Nov. 1, 2019.

(51) Int. Cl.
| | | |
|---|---|---|
| *G06F 16/21* | (2019.01) | |
| *G06F 16/215* | (2019.01) | |
| *G06N 20/00* | (2019.01) | |
| *G06F 17/18* | (2006.01) | |
| *G06T 11/20* | (2006.01) | |
| *G06F 16/22* | (2019.01) | |
| *G06N 3/02* | (2006.01) | |

(52) U.S. Cl.
CPC ........ *G06F 16/215* (2019.01); *G06F 16/2282* (2019.01); *G06F 17/18* (2013.01); *G06N 3/02* (2013.01); *G06N 20/00* (2019.01); *G06T 11/20* (2013.01)

(58) Field of Classification Search
CPC .... G06F 16/2282; G06F 16/215; G06F 17/18; G06N 20/00; G06N 3/02; G06T 2207/20084; G06T 11/20
See application file for complete search history.

(56) References Cited

U.S. PATENT DOCUMENTS

| | | | | |
|---|---|---|---|---|
| 10,726,018 | B2 * | 7/2020 | Chakrabarti | ...... G06F 16/24564 |
| 11,147,459 | B2 * | 10/2021 | Sobol | ...................... H04W 4/80 |
| 2019/0379589 | A1 * | 12/2019 | Ryan | ..................... G06N 3/0454 |
| 2020/0322703 | A1 * | 10/2020 | Bures | ..................... G06N 20/00 |
| 2020/0341466 | A1 * | 10/2020 | Pham | ..................... G06N 3/088 |
| 2020/0357117 | A1 * | 11/2020 | Lyman | ..................... G16H 50/20 |
| 2020/0387797 | A1 * | 12/2020 | Ryan | ..................... G06F 11/3006 |

* cited by examiner

*Primary Examiner* — Merilyn P Nguyen
(74) *Attorney, Agent, or Firm* — Plumsea Law Group, LLC

(57) ABSTRACT

A system and method for detecting anomalies in very large datasets is disclosed. The method includes calculating statistics for data elements in a data set over a range of time periods. These statistics are arranged into a 2D array and analyzed using a machine learning algorithm to detect anomalous regions. The method also includes steps of analyzing time series of the data based on detected anomalous regions, correcting any errors in the datasets, and storing the corrected values in a separate database to maintain data integrity.

20 Claims, 9 Drawing Sheets

| ENTRY ID | DATE | LABEL1 | LABEL2 | LABEL3 | ... |
|---|---|---|---|---|---|
| 102930 | 1/1/18 | 0.5 | 8 | 100 | ... |
| 102931 | 1/1/18 | 0.4 | 8 | 99 | ... |
| ... | | | | | ... |
| 114975 | 1/20/18 | 0.5 | 8 | 101 | ... |
| 114976 | 1/20/18 | 0.3 | 8 | 59 | ... |
| | | | | | |

| DATE | STAT1 | STAT2 | STAT3 | ... |
|---|---|---|---|---|
| JAN. 2018 | 0.0 | 0.1 | 0.5 | ... |

FIG. 5

| ENTRY ID | DATE | LABEL1 | LABEL2 | LABEL3 | ... |
|---|---|---|---|---|---|
| 102930 | 2/1/18 | 0.5 | 4 | 100 | ... |
| 102931 | 2/1/18 | 0.4 | 4 | 99 | ... |
| ... | | | | | ... |
| 114975 | 2/20/18 | 0.5 | 4 | 101 | ... |
| 114976 | 2/20/18 | 0.3 | 8 | 59 | ... |
| ... | ... | ... | ... | ... | ... |

| DATE | STAT1 | STAT2 | STAT3 | ... |
|---|---|---|---|---|
| FEB. 2018 | 0.4 | 0.2 | 0.7 | ... |

SYSTEM AND METHOD FOR LARGE SCALE ANOMALY DETECTION

CROSS-REFERENCE TO RELATED APPLICATIONS

This application claims the benefit of Provisional Patent Application No. 62/929,132 filed Nov. 1, 2019, and titled "System and Method for Large Scale Anomaly Detection," which is incorporated by reference herein in its entirety.

TECHNICAL FIELD

The present disclosure generally relates to big data, and in particular to detecting anomalies in big data.

BACKGROUND

A challenge today with the rapid growth in volume of data captured is assessing its level of quality at a large scale. Specifically, it is challenging to assess when data has been loaded or transformed incorrectly, or when the underlying/upstream data has undergone material changes. These data quality issues are common and can negatively impact downstream decision making, but they are extremely hard to uncover.

It is common for enterprises to have tables of data containing billions of rows, and to have thousands of such tables across various data warehouses. Automating the detection and alerting on data quality anomalies, and quantifying an overall quality index, is extremely challenging at this scale, and requires new innovation and techniques.

There is a need in the art for a system and method that addresses the shortcomings discussed above.

SUMMARY

In one aspect, a method of automatically detecting anomalies in a set of data includes steps of retrieving the set of data from a database, identifying a set of data elements for the set of data, selecting a set of time periods, and for each data label in the set of data labels and for each time period in the set of time periods, calculating a statistical value using the set of data. The method also include steps of creating a 2D array of statistical values (where one axis of the 2D array is associated with the set of data elements and where) another axis of the 2D array is associated with the set of time periods, using a machine learning algorithm to automatically detect anomalies in the 2D array, and correcting one or more values in the set of data based on the detected anomalies.

In another aspect, a method of correcting errors in a set of data to maintain data integrity includes steps of retrieving the set of data from a first database, identifying a set of data elements for the set of data, selecting a set of time periods, and for each data label in the set of data labels and for each time period in the set of time periods, calculating a statistical value using the set of data. The method also includes steps of creating a 2D array of statistical values (where one axis of the 2D array is associated with the set of data elements and where another axis of the 2D array is associated with the set of time periods), detecting an anomaly in the 2D array of statistical values, identifying a subset of data with errors based on the detected anomaly, storing corrected values for the subset of data in a second database, querying another set of data from the first database and determining that the queried set of data includes the subset of data with errors, and retrieving the corrected values for the subset of data from the second database.

In another aspect, a system for automatically detecting anomalies in a set of data the system includes a device processor, and a non-transitory computer readable medium storing instructions that are executable by the device processor to implement: (1) a statistics module that calculates a statistic for each data label in the set of data over a selected time period and generates a 2D array; and (2) a machine learning module that identifies anomalous regions in the 2D array.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 5 is a schematic view of a portion of a data table, according to an embodiment;

FIG. 6 is a schematic view of a portion of another data table, according to an embodiment;

DESCRIPTION OF THE EMBODIMENTS

The embodiments provide a system and method for automatically detecting anomalies in very large data sets (for example, database tables containing millions or billions of rows). To achieve this, the data is filtered into predetermined time periods and statistics for each data element are calculated for those time periods. A 2D array of these statistics is created, where one axis (or index) of the array corresponds to the predetermined time periods and another axis (or index) of the array corresponds to known data elements (or data labels). The 2D array can be plotted as a heat map and/or fed into a machine learning algorithm so that potential anomalies in the statistics can be automatically detected. Based on any detected anomalies, particular data elements can be further investigated and potential errors in the data can be identified and corrected. In some cases, corrected data values can be stored in a separate database or database table to maintain the integrity of the original dataset. The corrected values can then be accessed at run time for use in analysis and/or reporting.

By organizing the data into 2D arrays of representative statistics, changes in each data element (or data label) over time can be easily analyzed, either by visual inspection or using known machine learning algorithms to detect patterns in the 2D arrays. Because this method utilizes statistics that are representative of the underlying data, the method is highly scalable to data environments with an extremely large number of tables and data elements. Moreover, the method facilitates improved accuracy in detecting anomalies over previous techniques.

Figure 1:
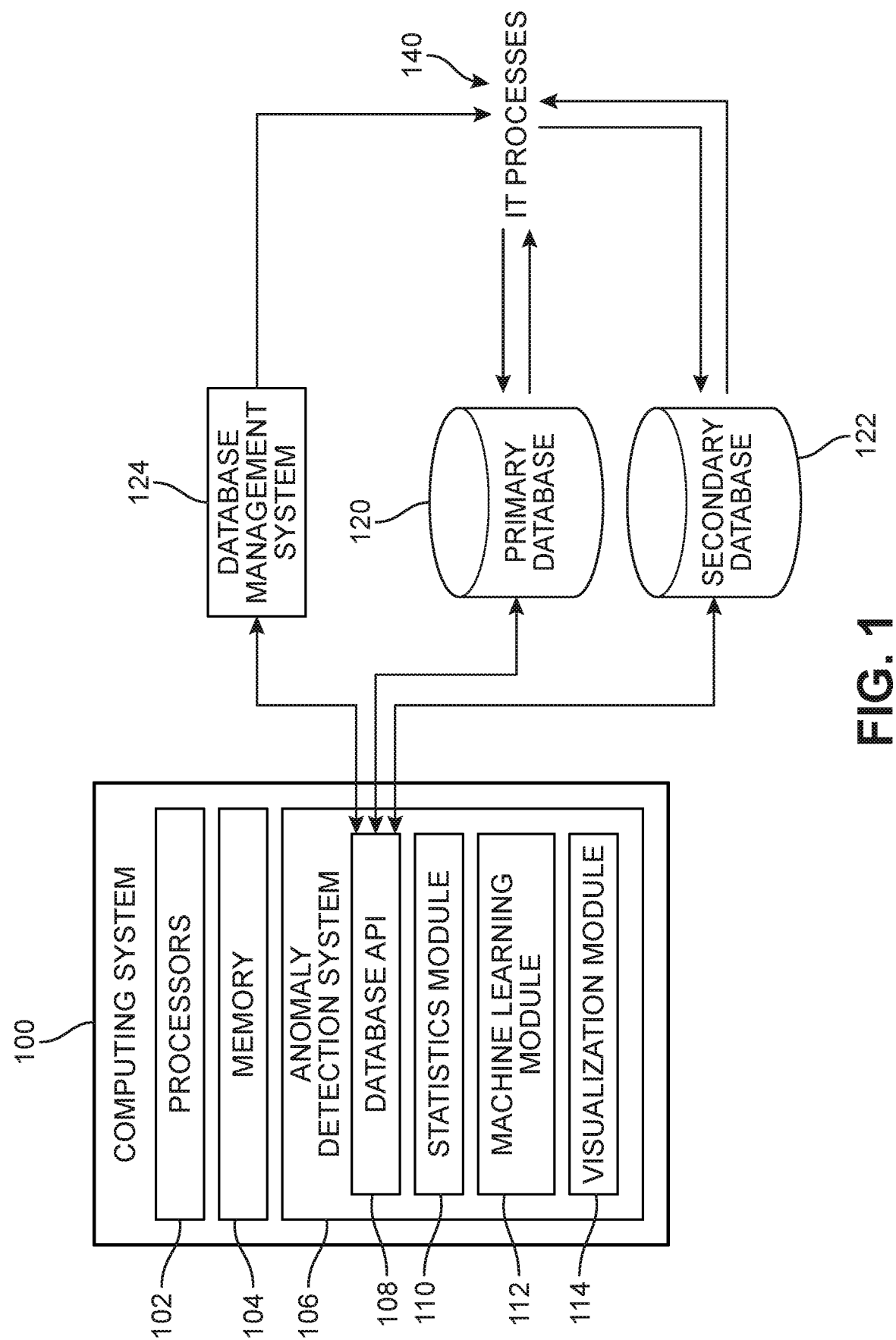
FIG. 1 is a schematic view of an embodiment of an anomaly detection system.

FIG. 1 is a schematic view of a computing system 100 that can be used for automated anomaly detection in large data sets. Computing system 100 could be any suitable system including a desktop computer, a laptop, a server, or a network of two or more computing systems. Computing system 100 may include one or more processors 102 and memory 104. Memory 104 may comprise a non-transitory computer readable medium. Instructions stored within memory 104 may be executed by the one or more processors 102.

Computing system 100 may further include an anomaly detection system 106. Anomaly detection system 106 may comprise one or more software modules and/or software applications. Although the exemplary embodiment depicts anomaly detection system 106 running within a single computing system, in other embodiments anomaly detection system 106 could be distributed over two or more different computing systems (for example, different processes associated with the system could run on two or more different servers).

Anomaly detection system 106 may further include a database Application Programming Interface (API) 108 that facilitates communication with a primary database 120 and a secondary database 122. These databases may themselves be in communication with other systems, which are collectively referred to in FIG. 1 as IT processes 140. Moreover, primary database 120 and secondary database 122 may store data sets that can be analyzed by anomaly detection system 106, as described in further detail below. In some cases, anomaly detection system 106 may also modify data sets, for example, by adding corrected values to secondary database 122. This process is described in further detail below and shown in FIG. 10.

Some embodiments may also include a separate database management system 124 that acts as an interface to the primary and secondary databases. Such a system could be used when there are different levels (or versions) of data, such as raw data and modified data, and there is a need to track which levels of the data reside in which databases. In some cases, this system could be directly accessible by database API 108 and also IT processes 140. In some embodiments, database management system 124 may act as an interface to the databases so that all queries are made to the system and all results are returned through the system. Alternatively, the system could act as a store of tracking information and databases could be separately accessed directly.

Anomaly detection system 106 may also include a statistics module 110. Statistics module 110 may include libraries and other provisions for computing various kinds of statistics, including means, percentiles, and missing value proportions of a set of data points. Statistics module 110 may also include provisions for calculating any other suitable kinds of statistics. As described in further detail below, statistics module 110 may include provisions for calculating changes in numerical or categorical distributions over time.

Anomaly detection system 106 may include machine learning module 112. Machine learning module 112 may include algorithms, libraries or other provisions for constructing, using, and deploying machine learning models that facilitate anomaly detection. Exemplary machine learning models can include both supervised and unsupervised learning models. Some embodiments can employ known anomaly detection techniques. These include, but are not limited to: density based techniques (such as k-nearest neighbor, local outlier factor, and isolation forests), outlier detection for high dimensional data, one-class support vector machines, replicator neural networks, autoencoders, long short-term memory neural networks, Bayesian networks, Hidden Markov models, clustering techniques, and suitable ensemble techniques. In some embodiments, machine learning module 112 includes a neural network for analyzing 2D arrays. In some embodiments, machine learning module 112 could include a convolutional neural network for analyzing 2D arrays.

Anomaly detection system 106 may also include visualization module 114. Visualization module 114 may include libraries and other provisions for plotting or otherwise representing data in a visual manner. In some cases, visualization module 114 includes algorithms for creating heatmaps from 2D arrays. In some cases, visualization module 114 includes algorithms for plotting time series.

Figure 2:
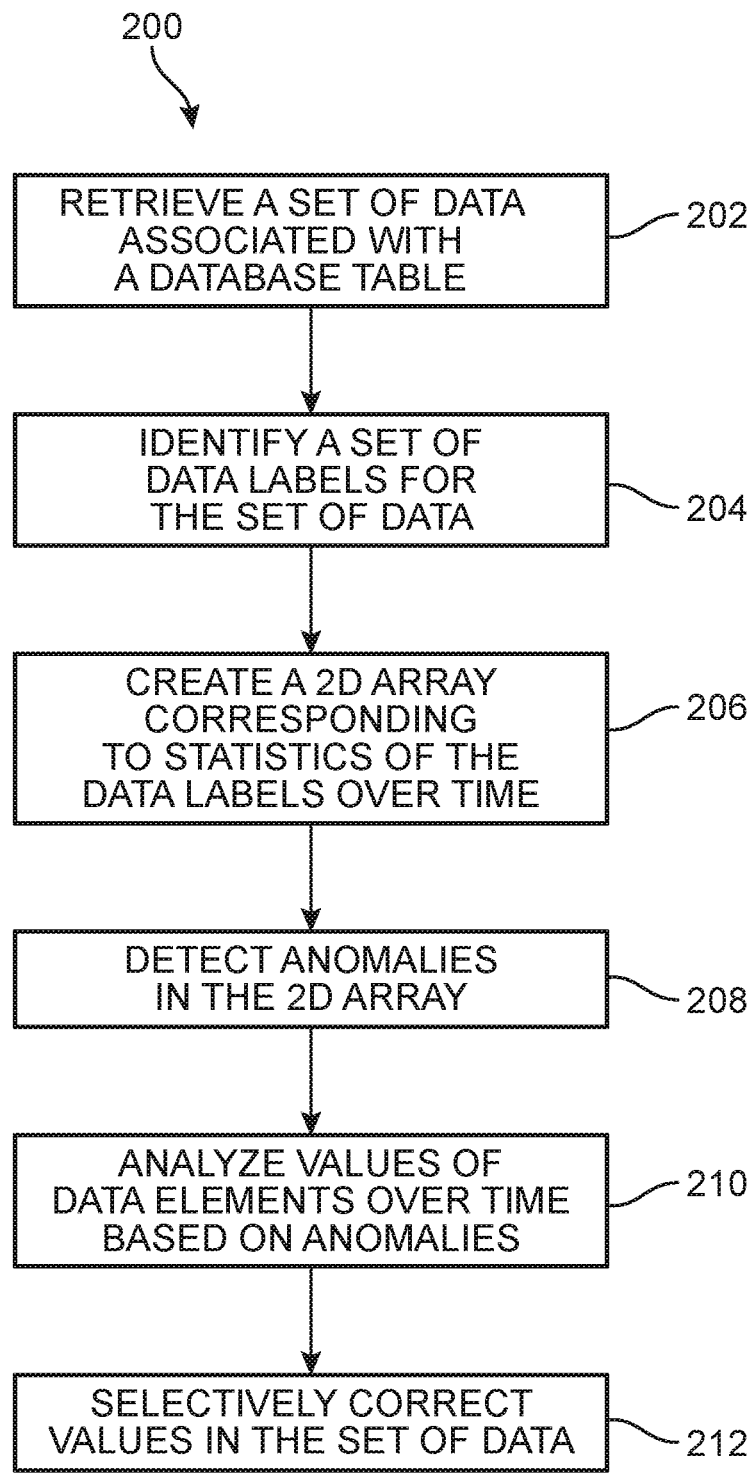
FIG. 2 is a schematic view of a process for performing anomaly detection, according to an embodiment.

FIG. 2 is a schematic view of a process for automatically detecting anomalies in data according to an embodiment. One or more of the following steps may be accomplished by an anomaly detection system, such as anomaly detection system 106 of FIG. 1.

Starting in step 202, an anomaly detection system may retrieve a set of data associated with a database table. For example, anomaly detection system 106 could retrieve a set of data from primary database 120. The set of data could comprise one or more database tables, or portions of database tables. Alternatively, the set of data could comprise any other data structure.

In step 204, the anomaly detection system may identify data labels (also referred to as data elements) for the set of data. For example, in a database table, the data labels may correspond to the labels associated with the data columns.

Based on the data labels identified in step 204, the anomaly detection system may create a 2D array corresponding to statistics for each of the data labels over time. As used herein, the term "2D array" (or "two-dimensional array") refers to a matrix-like data structure whose elements can be identified using two indexes.

Figure 3:
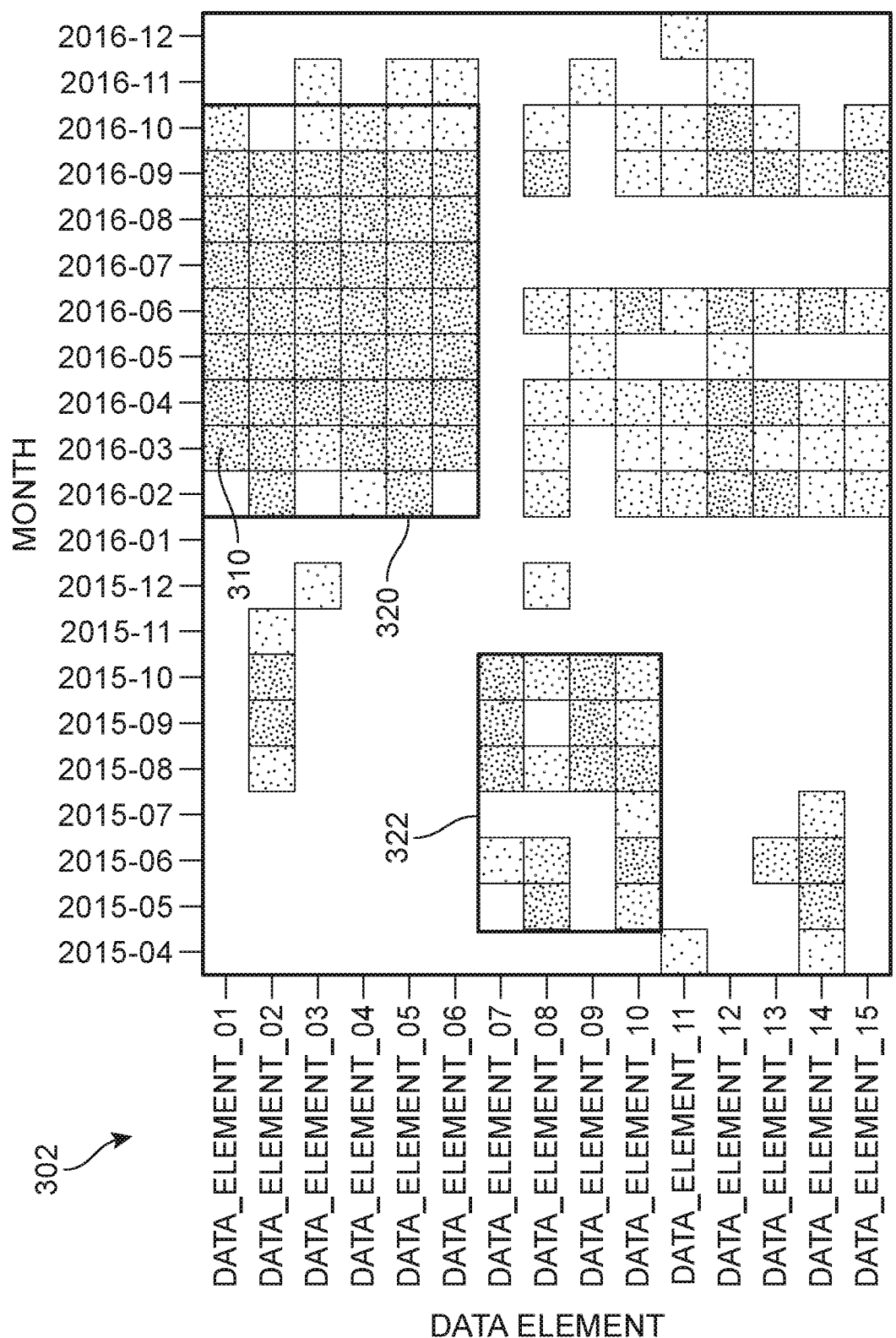
FIG. 3 is a schematic view of a heat map showing potential anomalies in a dataset, according to an embodiment.

As an example, FIG. 3 depicts a visualization of a 2D array for a selected database table corresponding to a data set used to track financial transactions for a financial institution. Specifically, a 2D array of data is plotted as a heat map 302, in which each element in the array is assigned a color in the plot according to its value. In this exemplary embodiment, each data element is represented as a square with a color ranging from white to dark shading. More specifically, in this case, larger values may be indicated with darker shading. Each square within heat map 302 corresponds to a statistic for a given data element (listed along the left side) within a given time period (listed across the top). For example, a first data element 310 corresponds to a statistic for the "DATA_ELEMENT_01" data label for the period of 2016-03 (March, 2016). The dark shading of first data element 310 indicates that the numeric distribution for this data label has changed significantly compared to previous periods.

Returning to the process of FIG. 2, after creating the 2D array in step 206, an anomaly detection system can automatically detect anomalies in the 2D array. As an example, an anomaly detection system analyzing the 2D array associated with heat map 302 of FIG. 3 may identify one or more anomalous regions where the values of the array are significantly greater than zero or some other threshold value. For purposes of illustration, a first anomalous region 320 and a second anomalous region 322 are highlighted in FIG. 3. Here, first anomalous region comprises a region within heat map 302 in which six of the data elements in the data set have a statistically significant shift in the distribution of values over a course of approximately 10 months. By contrast, second anomalous region 322 comprises a region within heat map 302 in which only four of the data elements have a statistically significant shift in values over the course of approximately six months. Moreover, the variation in values is greater in second anomalous region 322 compared to the variations in values within first anomalous region 320.

It may be appreciated that heat map 302 is a schematic representation of an underlying 2D data array that uses colors to represent numerical values. However, an anomaly detection system may or may not include provisions for graphically displaying 2D arrays as heat maps or in any other form. That is, an anomaly detection system may analyze a 2D array directly, without the need for an intermediate step of visualizing the data set. Optionally, in some cases, an anomaly detection system could detect one or more anomalous regions in a 2D array (that is, a subset of the 2D array with anomalous values) and then generate a visualization displaying the 2D array as a heat map including boundaries for the anomalous regions as depicted schematically in FIG. 3. Such a visualization could be used by a human operator to identify subsets of data that require further study. Additionally, the visualizations could be used to train an anomaly detection system when one or more machine learning algorithms are used.

Once an anomaly detection system has identified one or more anomalous regions, the values of data elements in the anomalous regions may be further analyzed in step 210. In some cases, this step may be performed automatically. However, in other cases, this step may be performed manually by a data analyst. An exemplary process for further analyzing individual data elements is described in further detail below.

In step 212, an anomaly detection system may selectively correct values in the set of data to remove the data anomalies. As described in further detail below, anomalies are not necessarily associated with errors in the data and may in some cases simply arise from chance or known causes.

Figure 4:
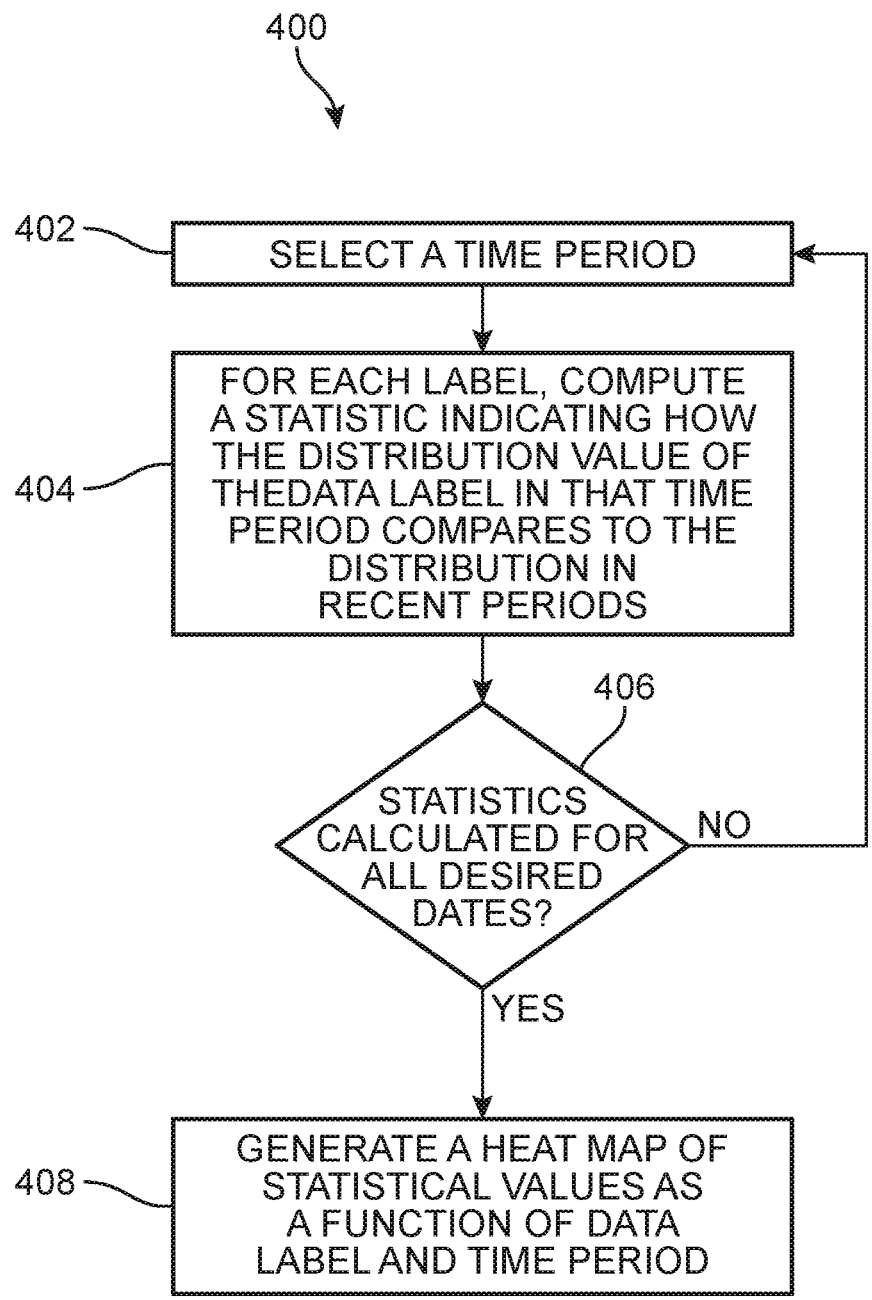
FIG. 4 is a schematic view of a process for calculating statistics for data in a data set, according to an embodiment.
Figure 7:
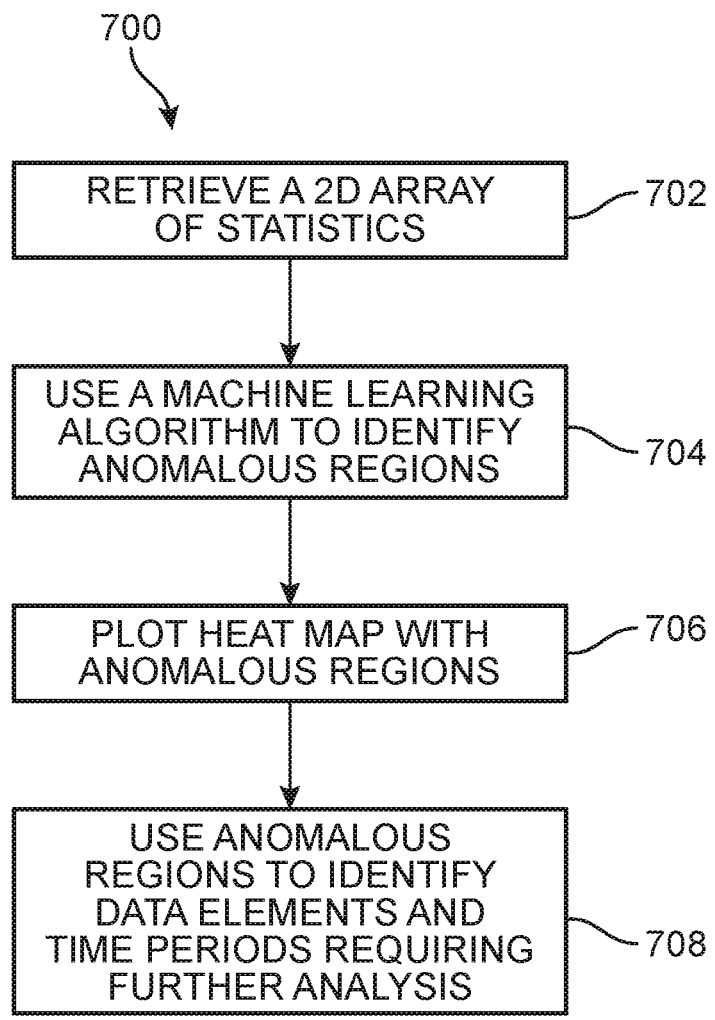
FIG. 7 is a schematic view of a process for automatically identifying potential anomalies in a heat map, according to an embodiment.

FIG. 4 is a schematic view of a process 400 for calculating the statistics to generate a 2D array, such as the array represented in heat map 302, according to an embodiment. In some cases, one or more of the following steps could be performed by a statistics module, such as statistics module 110. Starting in step 400, a statistics module may select a time period. The time period could be any suitable time period, including a single day, week, month, or even year.

Next, in step 404, the statistics module may compute a statistic for each label in the given time period. Specifically, the module could compute a statistic indicating how the distributions of values of the data label in the selected time period compares to the distribution of values in a baseline time period.

As an example, FIG. 5 depicts a table 500 of data entries (rows) in a set of data corresponding to January of 2018. As shown schematically in FIG. 5, statistics for each label may be computed over a selected time period. In this example, the time period is the month of January in 2018. Moreover, the values of the statistics may be indicative of how much the distribution of values for each label over the current time period differs from the distribution in one or more recent months. In other words, the statistic computes the degree of change in the value distribution over time, such that the values of the statistic are low when the value distribution is constant or changes slowly over time, and the values of the statistic are high when the value distribution changes quickly over time. Thus, high values of a statistic indicate that a given data label may have changed abruptly in a given time period, which could indicate a possible anomaly.

Referring back to FIG. 4, once the statistics have been calculated for each label in a given time period, the statistics module checks to see if statistics have been calculated for all desired dates. Here, the desired dates could be automatically selected by the system or input by a user. If so, the system proceeds to step 408. Otherwise the system returns to step 402 to pick a new time period and calculate statistics as before. FIG. 6 is a schematic example of another table 600 of a set of data for the time period February 2018. As before, a statistic for each data label in this period can be calculated, and is indicated schematically at the bottom of the table.

In step 408, a statistics module can generate a 2D array of statistics as a function of data label and time period. Such an array could optionally be visualized as a heat map (for example heat map 302).

Once a 2D array of statistics have been created, an anomaly detection system can use one or more machine learning techniques to automatically identify potential anomalies in the data. Starting in step 702, an anomaly detection system can retrieve a 2D array of statistics. Next, in step 704, a machine learning algorithm may be used to identify anomalous regions in the 2D array. These anomalous regions may correspond to subsets of the 2D array where the computed statistics on changes to value distributions are significantly greater than zero or some other threshold.

The embodiments could utilize any kind of machine learning algorithm. In some embodiments, a 2D array could be fed into a neural network that can identify the boundaries of one or more anomalous regions. For example, convolutional neural networks can be trained to identify patterns in 2D images, which comprise 2D arrays of pixel values. In some cases, a region based convolutional neural network (R-CNN) could be used. Other suitable machine learning models for selecting subsets within a 2D array may include clustering algorithms and support vector machines. In other embodiments, other methods could be used to identify the boundaries of one or more anomalous regions, including, for example, any suitable algorithms used in computer vision.

In an optional step 706, an anomaly detection system may automatically plot a heat map with the anomalous regions indicated graphically, as shown schematically, for example, in FIG. 3. This visualization may allow a user to identify particular data elements (and periods of time) that should be further investigated for sources of possible errors, as in step 708.

Figure 8:
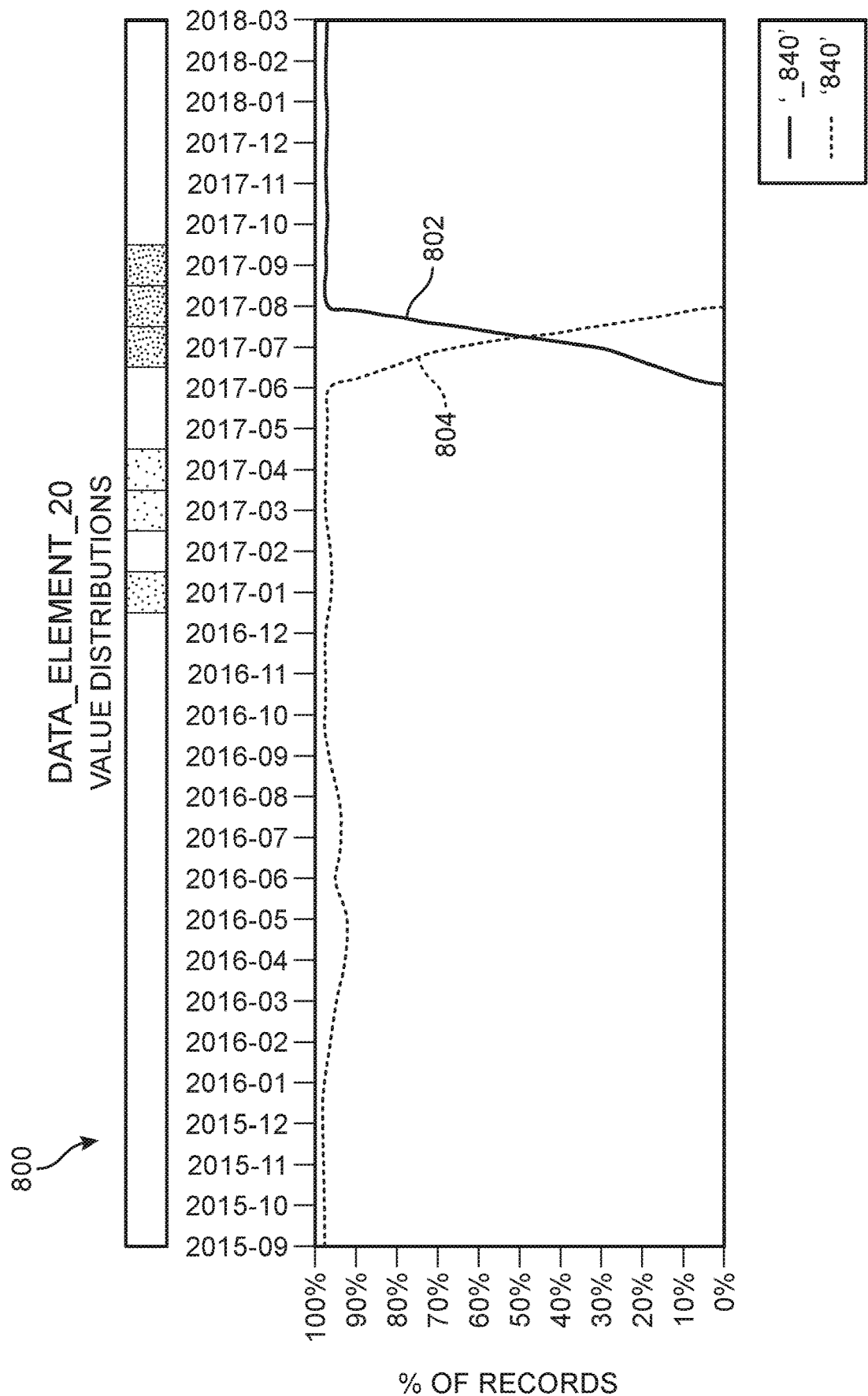
FIG. 8 is a schematic view of a plot of data values, according to an embodiment.
Figure 9:
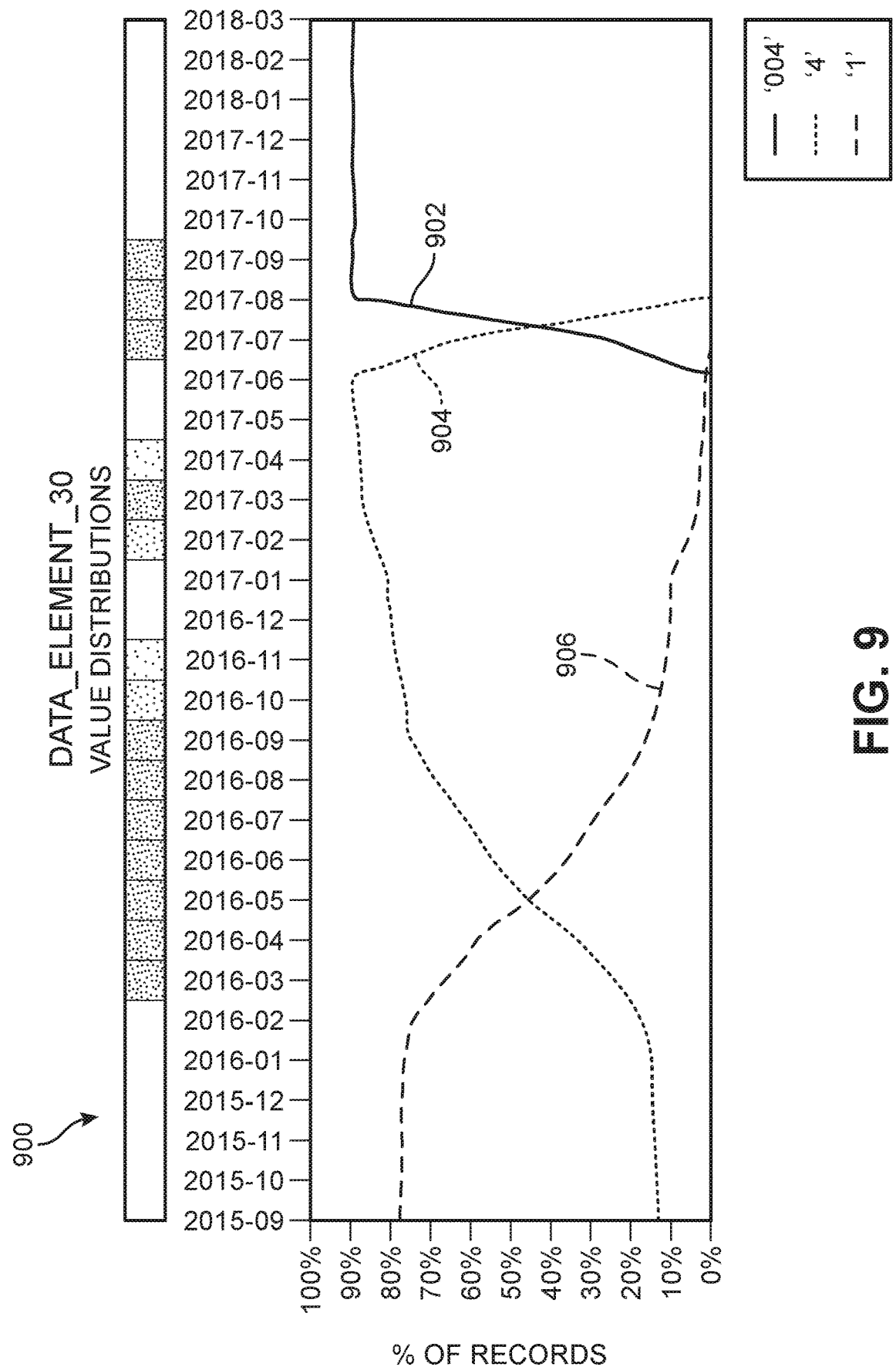
FIG. 9 is a schematic view of another plot of data values, according to an embodiment.

FIGS. 8 and 9 are schematic views of time series showing the number of records having a particular value in a given time period. In FIG. 8, a time series plot 800 for the data element "DATA_ELEMENT_20" is shown. Here, DATA_ELEMENT_20 is a variable name for a property of a financial transaction. The time series shows the percent of total records that have the value '_840' vs. '840' are plotted as first line 802 and second line 804, respectively over the time period between September 2015 (2015-09) and March 2018 (2018-03). The statistics for this data label as a function of time are also plotted above in the box labeled "STATISTIC".

In this case, the actual values of the data element DATA_ELEMENT_20 can be further investigated based on the fact that some values of the associated statistic have been identified as anomalous by a machine learning model in a previous step. As indicated in the STATISTIC box at the top of the chart, the statistics may have anomalous values in the period between July 2017 and September 2017. More specifically, the number of records having the value '_840' vs. '840' switches quickly in the period between July 2017 and September 2017. In the present example, this change has occurred because one of the IT processes responsible for populating the values of DATA_ELEMENT_20 mistakenly started adding a leading '_' character to the code '840'. This is therefore indicative of an error that should be corrected, which would resolve the identified anomaly.

In FIG. 9, a time series plot 900 for the data element "DATA_ELEMENT_30" is shown. Here, DATA_ELEMENT_30 is a variable name for the code representing the account type of a financial transaction. The time series shows the percent of total records that have the value '004', '4', or '1' are plotted as first line 902, second line 904, and third line 906, respectively, over the time period between September 2015 (2015-09) and March 2018 (2018-03). The statistics for this data label as a function of time are also plotted above in the box labeled "STATISTIC".

In this case, the actual values of the data element DATA_ELEMENT_30 can be further investigated based on the fact that some values of the associated statistic have been identified as anomalous by a machine learning model in a previous step. As indicated in the STATISTIC box at the top of the chart, the statistics may have anomalous values in the period between July 2017 and September 2017. More specifically, the percentage of records having the value '004' vs. '4' switches quickly in the period between July 2017 and September 2017. In the present example, this change has occurred because one of the IT processes (IT processes 140) responsible for populating the values of DATA_ELEMENT_30 mistakenly started adding two leading zeroes. This is therefore indicative of an error that should be corrected, which would resolve the identified anomaly.

It may not be the case that detected anomalies are always the result of errors that need to be corrected. In the same time series of FIG. 9 another anomaly associated with the time period February 2016 through November 2016 is also indicated. Here, as shown in the plot, the percentage of records having the values '4' vs. '1' switches over this period. In this case, the financial institution migrated the account types for all accounts. This led to a gradual change in the number of transactions made with the different account types as the old accounts were slowly phased out. Therefore, upon further inspection, the "anomaly" associated with the period February 2016 through November 2016, for this particular data element, is not indicative of an actual error and the underlying data values do not need to be corrected.

Figure 10:
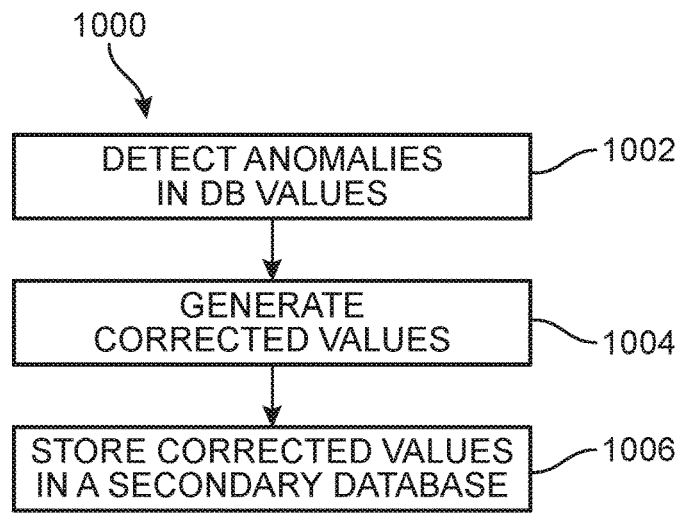
FIG. 10 is a schematic view of a process for storing corrected data values, according to an embodiment.
Figure 11:
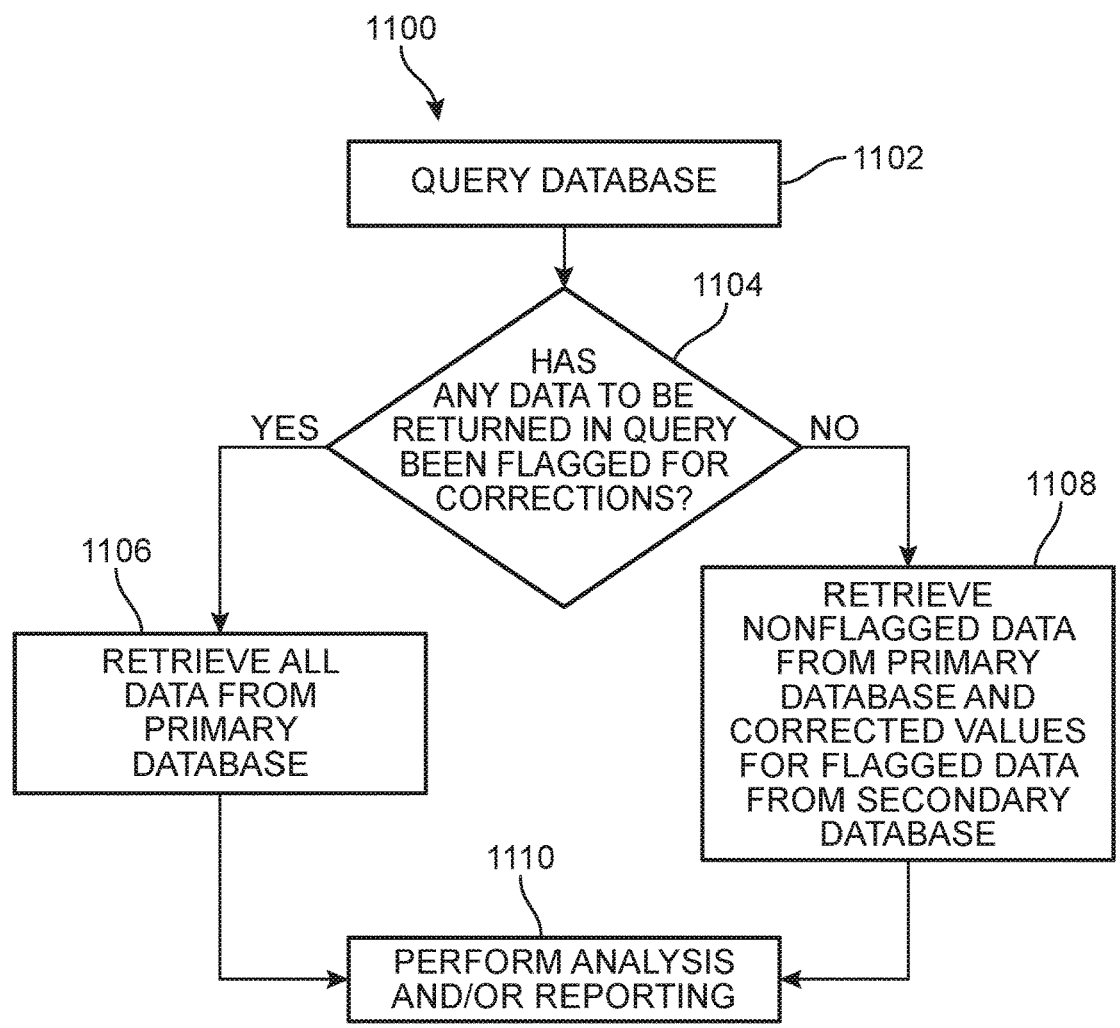
FIG. 11 is a schematic view of a process for using corrected data values, according to an embodiment.

FIGS. 10 and 11 are schematic views of processes for storing corrected data values and retrieving corrected data values, respectively. Specifically, FIG. 10 is a schematic view of a process 1000 for storing corrected values in a secondary database. Starting in step 1002, an anomaly detection system (such as anomaly detection system 106) may detect anomalies in database values using the methods described above. Next, in step 1004, the system may generate corrected values. In some cases, the system could automatically generate new values. In other cases, the system could be guided by a user in generating new values. Finally, in step 1006, the system may store the corrected values in a secondary database (such as secondary database 122). By storing the corrected values in a secondary database, rather than modifying the original values in the primary database, the integrity of the original data can be maintained. The system could then flag the subset of values in the primary database that have been corrected in a dataflow management system (such as database management system 124).

FIG. 11 is a schematic view of a process 1100 that may be performed upon retrieving data. In some cases, one or more of these steps could be performed by an external application (for example, one of the IT processes 140). Data could be retrieved, for example, to facilitate analysis and/or reporting.

In a first step 1102, a system could query a database, such as primary database 120 and/or a database management system (such as database management system 124). Next in step 1104, a database management system (or another system) could determine if any queried data has been flagged for corrections. If not, all the data may be retrieved from the primary database in step 1106. If some data has been flagged, the non-flagged data may be retrieved from the primary database while the flagged data may be retrieved from a secondary database in step 1108. Thus, the returned data may be comprised of corrected values. In a final step 1110, the system may perform analysis and/or reporting using the returned data.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smartphones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A method of automatically detecting anomalies in a set of data, comprising:
   retrieving the set of data from a database;
   identifying a set of data labels for the set of data;
   selecting a set of time periods;
   for each data label in the set of data labels and for each time period in the set of time periods, calculating a statistical value using values in each data label over each time period, each statistical value indicating a degree of change in the values in a given data label over a given period of time;
   creating a 2D array of statistical values, wherein one axis of the 2D array is associated with the set of data labels and wherein another axis of the 2D array is associated with the set of time periods;
   using a machine learning algorithm to automatically detect anomalies in the 2D array by identifying high statistical values in the 2D array that indicate that values in a given data label changed abruptly over a given time period; and
   correcting one or more values in the set of data based on the detected anomalies.

2. The method according to claim 1, wherein the set of data comprises a database table, and wherein the set of data labels correspond to columns in the database table.

3. The method according to claim 1, wherein calculating the statistical value comprises calculating how the distribution of values of a particular data label within a particular time period changes compared to previous time periods.

4. The method according to claim 1, wherein the 2D array corresponds to a heat map of statistical values.

5. The method according to claim 1, wherein the machine learning algorithm is a neural network.

6. The method according to claim 1, wherein the machine learning algorithm is a supervised learning algorithm and wherein the method further comprises a step of training the supervised learning algorithm.

7. The method according to claim 1, wherein the method further includes a step of graphically plotting values of at least one data label in the set of data labels over a predetermined time period, wherein the at least one data label and the predetermined time period are selected according to the detected anomalies.

8. A method of correcting errors in a set of data to maintain data integrity, comprising:
   retrieving the set of data from a first database;
   identifying a set of data labels for the set of data;
   selecting a set of time periods;
   for each data label in the set of data labels and for each time period in the set of time periods, calculating a statistical value using the set of data;
   creating a 2D array of statistical values, wherein one axis of the 2D array is associated with the set of data labels and wherein another axis of the 2D array is associated with the set of time periods;
detecting an anomaly in the 2D array of statistical values;
identifying a subset of data with errors based on the detected anomaly;
storing corrected values for the subset of data in a second database;
querying another set of data from the first database and determining that the queried set of data includes the subset of data with errors; and
retrieving the corrected values for the subset of data from the second database.

9. The method according to claim 8, wherein the method further includes flagging the subset of data with errors.

10. The method according to claim 9, wherein after querying the another set of data, the method includes a step of receiving information about the flagged subset of data and information about the location of the corrected values for the subset of data.

11. The method according to claim 8, wherein detecting the anomaly in the 2D array comprises using a machine learning model to detect anomalies.

12. The method according to claim 11, wherein the machine learning model is a neural network.

13. The method according to claim 11, wherein the machine learning model is a clustering algorithm.

14. A system for automatically detecting anomalies in a set of data the system comprising:
a device processor; and
a non-transitory computer readable medium storing instructions that are executable by the device processor to implement:
a statistics module that calculates a statistical value for each data label in a set of data labels for the set of data over a selected time period using values in each data label over the selected period of time, each statistical value indicating a degree of change in the values in a given data label over the selected period of time and generates a 2D array; and
a machine learning module that identifies anomalous regions in the 2D array by identifying high statistical values in the 2D array that indicated that values in a given data label changed abruptly over the given time period.

15. The system according to claim 14, further comprising a visualization module for generating a heat map of the 2D array and displaying boundaries of the identified anomalous regions.

16. The system according to claim 14, further comprising a database API that communicates with at least one database.

17. The system according to claim 14, wherein the statistic is indicative of how an average value of the data label in one time period compares to the average value of the data label in a previous time period.

18. The system according to claim 14, wherein the machine learning module includes a neural network.

19. The system according to claim 18, wherein the neural network is a convolutional neural network.

20. The system according to claim 14, wherein a first index of the 2D array corresponds to different data elements and wherein a second index of the 2D array corresponds to different time periods.

\* \* \* \* \*